(12) United States Patent  (10) Patent No.: US 8,408,444 B2
Park et al.  (45) Date of Patent: Apr. 2, 2013

(54) FRICTION STIR TOOL

(75) Inventors: Seunghwan Park, Mito (JP); Satoshi Hirano, Hitachi (JP); Shinya Imano, Hitachi (JP); Jun Sato, Hitachi (JP); Hiroyuki Kokawa, Sendai (JP); Yutaka Sato, Sendai (JP); Kiyohito Ishida, Sendai (JP); Toshihiro Omori, Sendai (JP)

(73) Assignees: Hitachi, Ltd., Tokyo (JP); Tohoku University, Miyagi (JP)

( * ) Notice: Subject to any disclaimer, the term of this patent is extended or adjusted under 35 U.S.C. 154(b) by 0 days.

(21) Appl. No.: 12/805,832

(22) Filed: Aug. 20, 2010

(65) Prior Publication Data

US 2011/0062214 A1 Mar. 17, 2011

(30) Foreign Application Priority Data

Sep. 17, 2009 (JP) .................... 2009-215998

(51) Int. Cl.
*B23K 20/12* (2006.01)
(52) U.S. Cl. ...................... 228/2.1; 228/112.1
(58) Field of Classification Search ............ None
See application file for complete search history.

(56) References Cited

U.S. PATENT DOCUMENTS

| 7,122,761 | B2 | 10/2006 | Ditzel et al. | |
|---|---|---|---|---|
| 7,645,315 | B2 * | 1/2010 | Liu | 75/236 |
| 2004/0134972 | A1 * | 7/2004 | Nelson et al. | 228/112.1 |
| 2005/0129960 | A1 * | 6/2005 | Liu et al. | 428/427 |
| 2005/0249978 | A1 * | 11/2005 | Yao | 428/699 |
| 2007/0119276 | A1 * | 5/2007 | Liu | 75/232 |
| 2007/0187465 | A1 * | 8/2007 | Eyre et al. | 228/101 |
| 2007/0272724 | A1 * | 11/2007 | Christopherson | 228/2.1 |
| 2007/0284419 | A1 * | 12/2007 | Matlack et al. | 228/112.1 |
| 2008/0023524 | A1 * | 1/2008 | Ohashi et al. | 228/2.1 |
| 2008/0128472 | A1 * | 6/2008 | Park et al. | 228/2.1 |
| 2008/0185078 | A1 * | 8/2008 | Ishida et al. | 148/674 |
| 2008/0190907 | A1 * | 8/2008 | Fujii et al. | 219/137 WM |
| 2008/0217377 | A1 * | 9/2008 | Stol et al. | 228/2.3 |
| 2008/0251571 | A1 * | 10/2008 | Burford | 228/114.5 |

(Continued)

FOREIGN PATENT DOCUMENTS

| JP | 2712838 | 10/1997 |
|---|---|---|
| JP | 2003-532543 | 11/2003 |

(Continued)

OTHER PUBLICATIONS

Japanese Patent Official Notification dated Aug. 5, 2011, in connection with Japanese Application No. 2009-215998; 5 pages; Japanese Patent Office, Japan; together with Partial English Translation thereof.

(Continued)

*Primary Examiner* — Kiley Stoner
(74) *Attorney, Agent, or Firm* — Antonelli, Terry, Stout & Kraus, LLP.

(57) ABSTRACT

It is an object to provide a friction stir tool excellent in productivity, high temperature strength, and wear resistance at high temperatures.
The friction stir tool is formed of a Co-based alloy comprising crystal grains containing a γ' precipitate phase dispersed and precipitated therein, and a crystal grain boundary region and a precipitate phase between adjacent crystal grains, in which the precipitate phase is at least one phase selected from a μ phase, a Laves phase and a carbide phase.

10 Claims, 3 Drawing Sheets

U.S. PATENT DOCUMENTS

| | | | |
|---|---|---|---|
| 2009/0166395 A1* | 7/2009 | Nakata et al. | 228/112.1 |
| 2009/0212089 A1* | 8/2009 | Christopherson, Jr. | 228/1.1 |
| 2010/0038832 A1* | 2/2010 | Rosal et al. | 266/46 |
| 2010/0065092 A1* | 3/2010 | Matlack et al. | 134/105 |
| 2010/0178526 A1* | 7/2010 | Fujii et al. | 428/615 |
| 2010/0258612 A1* | 10/2010 | Kolbeck et al. | 228/2.1 |
| 2010/0288817 A1* | 11/2010 | Yao | 228/2.1 |
| 2010/0291406 A1* | 11/2010 | Suzuki et al. | 428/680 |

FOREIGN PATENT DOCUMENTS

| | | | |
|---|---|---|---|
| JP | 2004-082144 | | 3/2004 |
| JP | 2005-152909 | | 6/2005 |
| JP | 2005-199281 | | 7/2005 |
| JP | 2006-320958 | | 11/2006 |
| JP | 2008-036664 | | 2/2008 |
| JP | 2008-036664 A * | | 2/2008 |
| JP | 2008-132524 A * | | 6/2008 |
| JP | 2008-264806 | | 11/2008 |
| WO | WO 93/10935 | | 6/1993 |
| WO | WO 01/85385 | | 11/2001 |
| WO | WO 2007/032293 A1 | | 3/2007 |
| WO | WO 2007/089882 | | 8/2007 |
| WO | WO 2009/062216 | | 5/2009 |

OTHER PUBLICATIONS

Osaki et al., Properties of γ' Strengthening Co—W—Al Alloys with Various Amounts of γ'-Forming Elements, Electric Furnace Steel, Aug. 2008, pp. 197-205, vol. 79, No. 3.

Suzuki, Akane et al., Flow Stress Anomalies in γ/γ' Two-Phase Co—Al—W-Base Alloys, Scripta Materialia, 2007, pp. 385-388, 56.

Mishra, Rajiv S. et al., Friction Stir Welding and Processing, 2007, pp. 7-35.

Extended European Search Report, including the European Search Report and European Search Opinion, dated Dec. 1, 2011, for EP Application No. 10173298.0-2302/2298486.

Japanese Official Action dated Mar. 6, 2012, for JP Application No. 2009-215998.

* cited by examiner

360mm WELDING × 2 TIMES

360mm WELDING × 37 TIMES

DIRECTION OF WELDING

FRICTION STIR TOOL

CLAIM OF PRIORITY

The present application claims priority from Japanese Patent application serial No. 2009-215998, filed on Sep. 17, 2009, the content of which is hereby incorporated by reference into this application.

BACKGROUND OF THE INVENTION

1. Field of the Invention

The present invention relates to a friction stir tool.

2. Description of Related Art

There exists a friction stir welding method which conducts welding by inserting a cylindrical member formed of a material which is substantially harder than materials to be joined (hereinafter the cylindrical member is referred to as rotational tool, stirring tool or friction stir tool. Or it is also referred to simply as welding tool.) into a joined part of the materials to be joined while rotating the cylindrical member, rotating and moving this rotational tool at the same time to join the materials to be joined by the frictional heat generated between the rotational tool and the materials to be joined.

Japanese Patent No. 2712838 (Patent Document 1) discloses a friction welding method for joining workpieces (1A, 1B) in a joint region (2), in which a probe (3) of material harder than the workpiece material is inserted into the joint region (2) and opposed portions of the workpieces on both sides of the joint region to cause relative cyclic movement between the probe and the workpieces so that frictional heat is generated to cause the opposed portions to take up a plasticized condition; the probe (3) is removed; and the plasticized portion is allowed to solidify and join the workpieces together, whereby the workpieces are joined without relative movement between themselves. This joining method involves softening the materials to be joined by the frictional heat between the rotational tool and the materials to be joined and utilizing the plastic flow phenomenon caused by the rotation of the rotational tool, and is based on a principle different from a method of welding by dissolving the materials to be joined, for example, arc welding and the like.

JP-A-2008-36664 (Patent Document 2) discloses a friction stir welding tool which has a cylindrical body of revolution and a probe coaxially projecting from a shoulder on its end face, and joins a pair of joined members by rotating the probe and inserting it into the joined parts of the joined members where they are abutted so that the joined part is softened by the frictional heat generated and stirred, in which the probe and the body of revolution are attachable and detachable, and the probe is formed of a cemented carbide or a cobalt-based alloy copper (MP159).

JP-A-2005-152909 (Patent Document 3) discloses a rotational tool for a friction stir welding for integrating a joined part of metal pieces by a friction stirring, in which a deposition prevention film for preventing deposition of a joining material metal on a surface of a portion which comes into contact with the metal.

JP-A-2004-82144 (Patent Document 4) discloses a friction stir welding tool which is made of a material harder than a workpiece made of metal and is rotated, pressed and inserted into an abutment portion of a pair of workpieces made of the metal to join the workpieces made of the metal by friction stirring, the welding tool having a central member formed of metal, and a ceramic member which covers a region of the central member which comes into friction contact with at least the workpieces made of the metal, the ceramic member comprising a nitride of Si, and the central member being a heat-resistant alloy comprising at least one of Fe, Ni, Co and W as a main component.

JP-A-2003-532543 (Patent Document 5) discloses a friction stir welding tool which is capable of joining metal matrix composites (MMCs), ferroalloys, nonferrous alloys and superalloys by friction stir welding, the welding tool comprising a shaft, a shoulder, a pin, and a highly wear resistant material disposed in at least a portion of the shoulder and the pin, the shoulder being mechanically fixed on the shaft to prevent rotary motion of the shoulder with respect to the shaft, the highly wear resistant material having a first phase and a second phase, and being produced at an ultra high temperature under ultra high pressure, functionally allowing friction stir welding of MMCs, ferroalloys, nonferrous alloys and superalloys.

JP-A-2006-320958 (Patent Document 6) discloses a friction stir welding tool which is capable of conducting friction stir welding on a metal or an alloy having a melting point of 1600° C. or higher as a workpiece, and at least a portion of the welding tool which is brought into contact with the workpiece comprising iridium as a main component and rhenium, ruthenium, molybdenum, tungsten, niobium, tantalum, zirconium or hafnium or two or more of these as accessory components, and having a Micro Vickers Hardness of 200 Hv or higher.

JP-A-2005-199281 (Patent Document 7) discloses a friction stir welding tool having a probe pin extending from a tip surface of a rotating rotator which is press-fitted onto a joined part of joined members and moved along this joined part to join the joined members in the joined part by friction stir welding, in which the portions of the probe pin and rotator which come into contact with at least the above-mentioned jointed members are constituted by a WC-based cemented carbide containing Co in an amount of 5 to 18% by weight.

WO2007/032293 (Patent Document 8) discloses Co-based alloy having highly heat resistant and high strength, comprising 0.1-10% of Al, 3.0-45% of W, and Co as the remainder except for inevitable impurities in terms of mass proportion, and has an $L1_2$ type intermetallic compound containing [$Co_3$(Al,W)] precipitated therein.

SUMMARY OF THE INVENTION

The friction stir tool of the present invention is characterized in that it is formed of a Co-based alloy comprising crystal grains containing a γ' precipitate phase dispersed and precipitated therein, crystal grain boundary region and precipitate phases between the adjacent crystal grains, and that the precipitate phase is at least one phase selected from a μ phase, a Laves phase and a carbide phase. In particular, it is preferable that the γ' precipitate phase has the composition: $Co_3$(Al,W), or $(Co,X)_3$(Al,W,Z). Here, X includes mainly Ni, and Z includes mainly Cr and Ta.

According to the present invention, production costs can be reduced by cast and processing into various tool configurations can be readily conducted. Therefore, the rotational tool for friction stir welding with excellent productivity and a low degree of wear at high temperature can be provided. In addition, by using the above welding tool, hard-to-weld materials such as Ti and Zr can be readily joined.

DETAILED DESCRIPTION OF THE PREFERRED EMBODIMENTS

Figure 1:
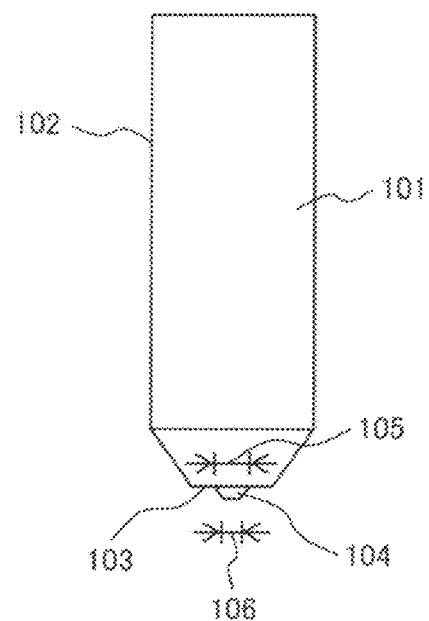
FIG. 1 is a side elevational view showing a constitution of a rotational tool of an example according to the present invention.

The present invention relates to a friction stirring tool (a friction stirring welding tool) for joining or reforming a material by friction stirring.

An object of the present invention is to provide a friction stir tool having high temperature strength, excellent wear resistance at high temperatures, and excellent productivity.

Friction stir welding of low-melting-point metallic materials such as aluminum alloys has already been put to practical use. Although the friction stir welding of high-melting-point materials such as steel materials has been reported relatively early, the number of research reports of the friction stir welding on the steel materials is much fewer than those on the aluminum alloys.

One of reasons for such a few reports is that the joining is not easy since the welding tool is thermally deformed when the steel rotational tool which is generally used in joining the aluminum alloys is applied to joining steel materials. The characteristics required for a material of the rotational tool in the friction stir welding of the high-melting-point materials such as steel materials include high temperature strength, wear resistance and unreactive property.

Patent Document 5 describes a ceramic material such as PCBN (Polycrystalline Cubic Boron Nitride manufactured by MegaStir, US) as a material of the rotational tool suitable for joining the steel materials and the high-melting-point materials.

Ceramic materials generally have high strength at high temperature, but are difficult to be cut at room temperature and cannot be easily processed into various tool configurations. In addition, they remain to be improved in terms of productivity since they are produced by sintering.

Meanwhile, Co-based alloys (cobalt-based alloys) also have relatively high strength at high temperature, and are expected to be good materials for the rotational tools. Possibilities of applying Co alloys to rotational tools are described in Patent Documents 2-4, 6 and 7 etc.

Since the Co-based alloys have relatively high machinability at room temperature compared with the ceramic materials, they can be processed into various configurations relatively easily. Therefore, the materials expectedly have economic advantages. However, since the strength of the Co-based alloy mentioned above is abruptly lowered at a temperature higher than 800° C., deterioration of the material of the welding tool itself progresses, causing wear and damage of the welding tool when the Co-based alloy is used as a rotational tool for joining high-melting point materials such as steel materials.

Patent Document 8 describes a Co-based alloy which seems to be capable of suppressing a rapid reduction in strength even at a high temperature around 1000° C. (a general joining temperature in the friction stir welding of the steel material). Patent Document 8 also describes a γ'-strengthened Co-4Al-26.9W (mass %) ternary alloy, in which the γ' solid solution forming temperature is raised as the amount of Ni contained increases. The γ' solid solution forming temperature is the most important factor to maintain high temperature strength.

The characteristics required for the stirring tool also include wear resistance, in addition to the high temperature strength. Meanwhile, as for the Co-based alloy described in Patent Document 8, factors which affect the wear resistance are unclear. Possible factors include not only γ' solid solution forming temperature but also the amount of γ' (volume fraction) and other precipitates.

Problems of the wear resistance in the rotational tool mentioned above can be solved by using a Co-based alloy as a material of the rotational tool. In the Co-based alloy, 10% to 80% by volume fraction of the γ' phase of $Co_3(Al,W)$ with the $L1_2$ structure are caused to precipitate.

The reason why the volume fraction of the γ' phase is limited to 10% to 80% is as follows:

When the volume fraction of the γ' phase was less than 10%, the high temperature strength could not be maintained and therefore the friction stir tool was partially deformed and the wear resistance was also insufficient. Meanwhile, when the volume fraction of the γ' phase was more than 80%, β phase with B2 structure and other phases were excessively precipitated, and the wear resistance of the tool degraded.

In addition to the characteristics of the Co-based alloy mentioned above, it is preferable that the Co-based alloy has characteristics that one or more phase (at least one phase) selected from a μ phase, a Laves phase and carbide (also referred to as a carbide phase.) are precipitated.

In a stirring temperature range of the friction stirring, a desirable chemical composition of the Co-based alloy which can maintain the high temperature strength and the wear resistance is such that about 10 at. % of Al, about 7.5 at. % of W, about 3 at. % of Ta, about 10 at. % of Cr, about 0.06 at. % of B, and about 0.6 at. % of C are contained, and Ni is contained in an amount of 30 to 50 at. %. In addition, it is desirable that Co is contained in an amount of 25 at. % or more. Herein, at. %, a unit which can be also indicated as atomic % (atomic percent), represents the number of each constituent atom with respect to the number of all atoms which constitute the alloy.

The proof strength of the Co-based alloy at room temperature in the above-mentioned composition range is about 800 MPa, which allows relatively easy machining. In addition, since the Co-based alloy can be processed by precision casting, it can be determined to have a large economic effect on production of a welding tool.

The friction stir tool of the present invention is characterized by comprising a cylindrical shank, a shoulder formed in an end portion of this shank, and a pin formed in an end portion of this shoulder. The friction stir tool is preferably an integrally formed article produced by casting or a machined product produced by using the Co-based alloy. The friction stir tool of the present invention is used by being mounted on a friction stir welding apparatus.

Examples of the present invention will be described below with reference to drawings.

Example 1

FIG. 1 is an example of the tool constitution in the rotational tool of the present invention.

A friction stir tool 101 is integrally machined from an ingot produced by precision casting. Rigidity of the welding tool can be improved by integrally processing the friction stir tool 101, and simplification of the welding tool production can be achieved, allowing significant cost reduction.

The friction stir tool 101 is constituted by a shank 102 connected to the main shaft of a welding apparatus, a shoulder 103 which comes into contact with the surface of materials to be joined when joining, and a pin 104 inserted into the materials to be joined when joining.

The shape of the welding tool 101 used was such that the diameter of the shoulder 103 was 15 mm. The pin 104 had a diameter in a pin-shoulder connecting part 105 connected to the shoulder 103 of 6 mm, while it had a diameter of 3.5 mm at a pin tip 106. The length of the pin 104 was adjusted to 1.8 mm. The thickness of an iron-based material used was 4 mm, which is a material to be joined. As the joining conditions, the rotational speed and joining speed of the welding tool 101 used were 250 rpm and 500 mm/min, respectively.

Figure 2:
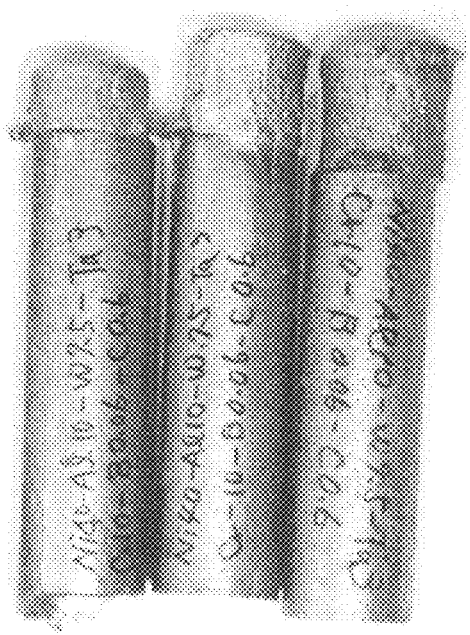
FIG. 2 is a photograph of an appearance of an ingot of a Co-based alloy which is a material of a rotational tool of the present invention.

FIG. 2 is a photograph of the appearance of an ingot of the Co-based alloy produced by the precision casting.

The ingot was produced to have the composition of Co-40Ni-10Al-7.5W-3Ta-10Cr-0.06B-0.6C. The units are all at. % (atomic % (atomic percent): the number of each constituent atom with respect to the total number of atoms constituting alloy). The amount of Co contained is about 29%. The outer diameter of the ingot was about 30 mm, and its length was about 100 mm, excluding a riser portion. It is a size sufficient for producing the rotational tool for friction stirring. In addition, it was confirmed that the ingot could be produced in an extremely short time of about a few minutes, and had excellent productivity. It was also confirmed that a welding tool having a near net shape could be produced by the precision casting.

After the ingot was produced, it was heat-treated at 1250° C. and air-cooled, followed by a heat-treatment at 1000° C. This is for precipitating a γ' phase of $(Co,X)_3(Al,W,Z)$ with the $L1_2$ structure necessary to maintain high temperature strength. Herein, X is mainly Ni, and Z is mainly Cr and Ta. In addition, the temperature of the above-mentioned heat treatment is also effective in precipitating a μ phase, a Laves phase and carbide, which are effective for enhancing the wear resistance and the grain boundary region.

Figure 3:
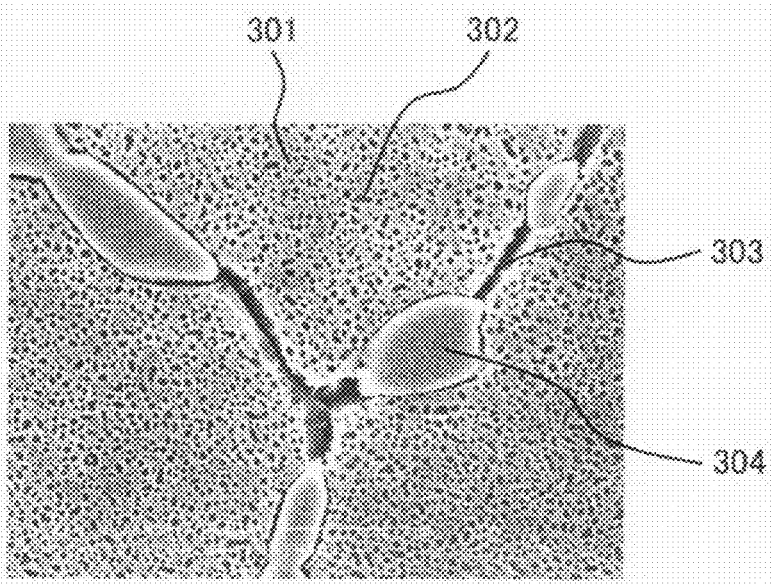
FIG. 3 is an electron micrograph showing a microstructure of an ingot of a Co-based alloy of an example according to the present invention.

FIG. 3 shows a microstructure photograph of the ingot.

The ingot is composed of a crystal grain 301, a γ' precipitate phase 302 finely dispersed and precipitated in a γ phase with an A1 structure within a grain of the crystal grain 301, a crystal grain boundary region 303, and a precipitate phase 304 existing at the crystal grain boundary region 303. The volume fraction of the γ' precipitate phase 302 is about 60%. The precipitate phase 304 is one or more types of phases selected from a μ phase, a Laves phase and a carbide phase. The precipitate phase 304 is a component which stabilizes the grain boundary region (a grain boundary region stabilizing component). Herein, The crystal grain 301 is a single grain which is surrounded by the crystal grain boundary region 303, in which a number of the γ' precipitate phase 302 (γ' grains) are dispersed in a Co matrix.

Such a microstructure is effective in improving the high temperature strength and the wear resistance.

Joining was conducted on iron-based material formed of SS400 by using a friction stir tool produced by processing the ingot shown in FIG. 2.

Figure 4:
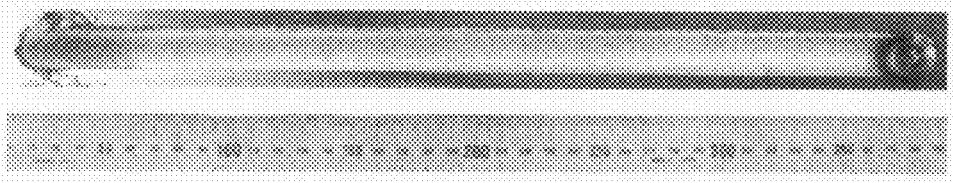
FIG. 4 is a photograph showing a joined part of an SS400 steel material produced by using the rotational tool made of the Co-based alloy of the present invention.

FIG. 4 is a photograph of the appearance of a joined part of the SS400 steel material (iron-based material) joined by using a friction stir tool produced by processing the ingot shown in FIG. 2 into the shape shown in FIG. 1.

As shown in this FIG. 4 (the joined part of the SS400 material mentioned above), it was confirmed that the friction stir welding of the SS400 material mentioned above by using the friction stir tool of the present invention was possible.

The rotational speed and joining speed of the welding tool 101 used as for joining conditions were 250 rpm and 500 mm/min, respectively. The joining distance was 360 mm, and joining was conducted multiple times. Changes in the shape of the friction stir tool due to joining distance were observed to evaluate the performance of the friction stir tool.

Figure 5A:
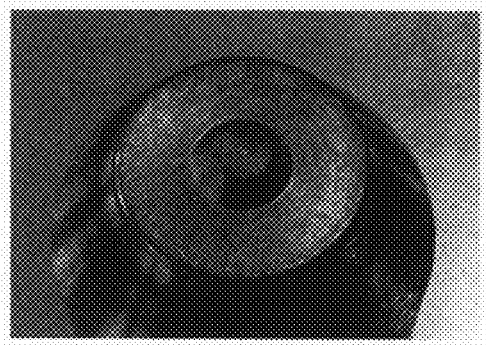
FIG. 5A is a photograph of an appearance of the surface of the rotational tool made of the Co-based alloy of the present invention after being used for welding (twice of 360 mm in length).
Figure 5B:
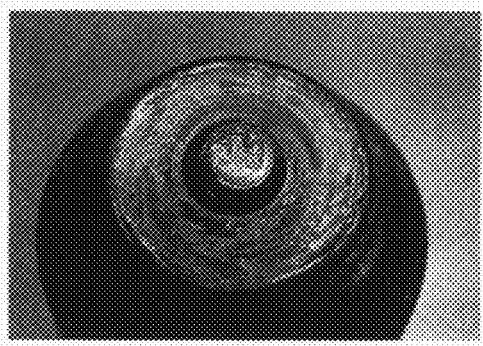
FIG. 5B is a photograph of an appearance of the surface of the rotational tool made of the Co-based alloy of the present invention after being used for welding (37 times of 360 mm in length).

FIG. 5A shows the appearance of the surface of the welding tool after joining for a distance of 360 mm twice and FIG. 5B shows the appearance of the welding tool after joining for 37 times. The total joining distance of the two trials was 0.72 m and 13.32 m, respectively.

As can be seen from FIGS. 5A and 5B, there is no visible damage found in the pin and the shoulder even after joining for a distance of 13.32 m (37 times). Almost no wear was observed, although the changes in the shape of the welding tool after joining were not clearly determined because the jointing material was slightly deposited on the pin and the shoulder.

Durational life of the welding tool was evaluated by using the above welding tool. As a result, it was confirmed that the degree of wear of the welding tool was low even after joining the total joining distance of 45 m or longer, and that the welding tool could be used as a welding tool.

The results described above demonstrate that the Co-based alloy tool can provide a friction stir tool for the SS400 steel material with a low degree of deformation and wear.

Examples 2 to 4

The finding that the friction stir welding by using the friction stir tool 101 of FIG. 1 can be applied to pure titanium and titanium alloys in addition to the iron-based materials was obtained. The titanium materials used in these examples are industrial pure Ti (Example 2), titanium alloy Ti-6Al-4V (Example 3), and titanium alloy Ti-15V-3Cr-3Sn-3Al (Example 4).

As for joining conditions, the rotational speed and joining speed of the welding tool 101 used were 200 rpm and 100 mm/min, respectively.

Figure 6:
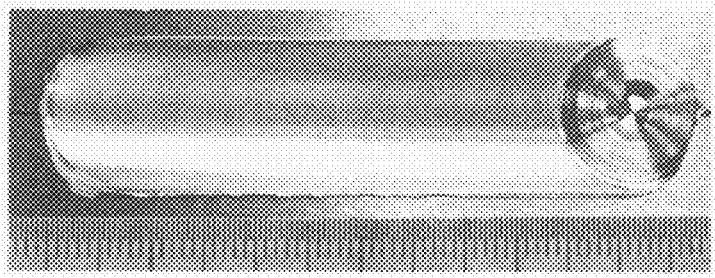
FIG. 6 is a photograph showing an appearance of a butt welding portion of a Ti-15V-3Cr-3Sn-3Al material produced by using the rotational tool made of the Co-based alloy of the present invention.

FIG. 6 is a photograph of the appearance of an abutment portion of the Ti-15V-3Cr-3Sn-3Al material joined by using the friction stir tool 101 of FIG. 1.

This figure reveals that an orderly surface of bead has been obtained. In addition, no wear or deformation was found in the shoulder and pin of the friction stir tool. In this example, it was found by a visual inspection of the welding tool after joining and by other tests that almost no reaction was caused between the rotational tool made of the Co-based alloy and the titanium alloy.

The results mentioned above clearly show that the friction stir tool of the present invention is also effective for the friction stir welding of the titanium alloys.

Example 5

The results of the friction stir tool formed of a Co-based alloy having the composition Co-30Ni-9.5Al-7.8W-2Ta-10Cr-0.06B-0.6C are shown below. All units are by at. %. The amount of Co contained is about 40%. This welding tool is denoted a welding tool 201. The welding tool 201 was produced in a manner similar to that of the welding tool 101. The volume fraction of the γ' precipitate phase in the above welding tool 201 is about 45%.

The results of determination of the solid solution forming temperature of the γ' precipitates by differential scanning calorimetry (DSC) are shown in Table 1. In this Table, in the case of the welding tool 101, that is, an alloy containing 40 at. % of Ni, the γ' solid solution forming temperature is 1163° C., while in the case of the welding tool 201, that is, an alloy containing 30 at. % of Ni, the γ' solid solution forming temperature is 1094° C.

TABLE 1

| | Solid solution forming temperature of γ' phase | Solidus temperature |
|---|---|---|
| Welding tool 101 | 1163° C. | 1339° C. |
| Welding tool 201 | 1094° C. | 1358° C. |

The results of the DSC in Table 1 show that the above welding tool 201 of this example has a solid solution forming temperature of the γ' precipitates of 1094° C. This is because the amounts of Ni and Ta contained in the friction stir tool of this example are less than those in the friction stir tool 101 of Example 1. The solid solution forming temperatures of the γ' phases in the welding tools 101 and 201 are higher than the joining temperature of the steel material SS400 (1000° C.). Therefore, it is thought that the γ' phase in the above welding tool is stable even during joining.

In a manner similar to that of Example 1, the joining was conducted on the SS400 iron-based material by the friction stir tool of this example. The friction stir tool of this example also had a shape similar to that of the friction stir tool of Example 1. The joining conditions used were also similar to those of Example 1. The joining distance was 360 mm, and joining was repeated multiple times.

The results demonstrated that friction stir welding of the SS400 material was also possible in this example.

Examples 6 to 12

The results of Examples 6 to 12 are shown in Table 2 along with those of Examples 1 to 5.

Table 2 shows examples of applications of the welding tools 101 and 201 to various joining materials.

It was confirmed that the welding tools 101 and 201 could be applied to an aluminum alloy having low melting point and stainless steels, Ti alloys and a Zr alloy having high melting points without any problems.

The surfaces of the welding tools were observed after joining, and the cases where no damage in the welding tools, no deposition of welding materials on their surfaces, and no defects in the joined parts were found were evaluated ○ (good).

The joining conditions applied to Examples 6 to 12 are as follows:

Example 6: N=800 rpm, V=200 mm/min, Example 7: N=200 rpm, V=100 mm/min, Example 8: N=100 rpm, V=50 mm/min, Example 9: N=200 rpm, V=100 mm/min, Example 10: N=200 rpm, V=100 mm/min, Example 11: N=100 rpm, V=50 mm/min, Example 12: N=200 rpm, V=100 mm/min, wherein N is the rotational speed, and V is the joining speed of the welding tool.

TABLE 2

| | 6N01 (Al alloy) | SS400 | SUS430 (AISI430) | SUS304 (AISI304) | Pure Ti | Ti64 | Ti15333 | Zircaloy |
|---|---|---|---|---|---|---|---|---|
| Welding tool 101 | Example 6 (○) | Example 1 (○) | Example 7 (○) | Example 8 (○) | Example 2 (○) | Example 3 (○) | Example 4 (○) | Example 9 (○) |
| Welding tool 201 | | Example 5 (○) | Example 10 (○) | Example 11 (○) | | Example 12 (○) | | |
| PCBN (Comparative Example) | Δ1 | Δ2 | Δ2 | Δ2 | X | X | X | X |

The γ' volume fractions in Examples 1 to 12 are shown in Table 3.

The γ' volume fractions in the welding tool after joining were described as follows:

A: 10% or more but less than 30%, B: 30% or more but less than 50%, C: 50% or more but less than 65%, D: 65% or more but 80% or less. Herein, for example, 10% or more but less than 30% means 10% or more and less than 30%.

TABLE 3

| | 6N01 (Al alloy) | SS400 | SUS430 | SUS304 | Pure Ti | Ti64 | Ti15333 | Zircaloy |
|---|---|---|---|---|---|---|---|---|
| Welding tool 101 | D | C | B | A | B | C | C | B |
| Welding tool 201 | | B | A | A | | B | | |

As can be seen from Tables 2 and 3, the friction stir welding tool comprising the Co-based alloy having a volume fraction of the γ' precipitate phase of 10% to 80% is obviously applicable to any joining. In addition, it can be seen that the γ' volume fraction in the friction stir welding tool is varied not only by the alloy composition of the welding tool, but also by the type of the joining material and joining conditions.

Comparative Example

Normally, when joining of the Ti alloy is conducted by using the rotational tool made of PCBN, wear of the welding tool is severe, and the surface of the joined part is also roughened. This is supposedly because N (nitrogen) contained in the rotational tool made of PCBN reacts with Ti (titanium) to form TiN (titanium nitride), which causes the welding tool to be more likely to wear.

Thus, titanium is a metal having activity, and is often found to react with the friction stir tool during joining. The results of joining active metals by the welding tool made of PCBN are shown in Table 2, but they were evaluated×(bad) since joining could not be conducted due to severe wear of the welding tool.

When the rotational tool made of a ceramic material such as PCBN is repeatedly used, cracks generated in the shoulder and pin and portions of the welding tool chipping away are often found. It is therefore the present situation that the lifetime of a rotational tool made of PCBN cannot be predicted. This is presumably because ceramic materials are vulnerable to thermal shock.

The results of joining of materials such as SS400, SUS430 (AISI430), and SUS304 (AISI304) by using the rotational tool made of PCBN are shown in Table 2. They were evaluated Δ2 since sudden breakage of the welding tool occurred during use. In contrast, it is supposed that abrupt breakage in the welding tool made of the Co-based alloy is unlikely to occur since the Co-based alloy is a metallic material.

Furthermore, when the rotational tool made of PCBN was applied to the aluminum alloy (6N01), the joining material (aluminum) was deposited on the surface of the welding tool, and the surface of the bead was roughened in some cases. Such a result is indicated as Δ1 in Table 2.

It was found that when the above-mentioned friction stir tool (the stirring tool made of the Co alloy) is applied to the friction stir welding of a structural portion of a high-melting point material, deformation by welding, spatters and residual stress are reduced. The friction stir welding using the friction stir tool of the present invention can be applied to structures such as panel members for automobiles and pipes.

What is claimed is:

1. A friction stir tool formed of a Co-based alloy having a γ phase with an A1 structure and a γ' phase with an $L1_2$ structure precipitated in the γ phase, the γ' phase comprising $Co_3(Al,W)$, and the γ' phase being contained in the γ phase in an amount of 10% to 80% in terms of volume fraction, being formed by precision casting, the Co-based alloy including 30-50 at. % of Ni, and the γ' phase thereof having a solid solution forming temperature higher than 1,000° C., wherein the Co-based alloy contains a precipitate selected from a μ phase, a Laves phase and a carbide.

2. The friction stir tool according to claim 1, wherein the Co-based alloy contains Co in an amount of 25 at. % or more.

3. The friction stir tool according to claim 1, comprising a cylindrical shank, a shoulder formed in an end portion of the shank, and a pin formed in an end portion of the shoulder.

4. The friction stir tool according to claim 3, being an integrally formed article of the Co-based alloy produced by the precision casting.

5. The friction stir tool according to claim 4, being a machined product of the Co-based alloy made of the integrally formed article.

6. A friction stir welding apparatus comprising the friction stir tool according to claim 1.

7. The friction stir tool according to claim 1, wherein the Co-based alloy includes about 10 at. % of Al, about 7.5 at. % of W, about 3 at. % of Ta, about 10 at. % of Cr, about 0.06 at. % of B, about 0.6 at. % of C, and at least 25 at. % of Co.

8. The friction stir tool according to claim 1, having a property of being capable of joining, by friction stir welding, high-melting point materials selected from the group consisting of steel materials, titanium and alloys thereof, and zirconium and alloys thereof.

9. The friction stir tool according to claim 1, being heat-treated and air-cooled after the precision casting.

10. The friction stir tool according to claim 1, wherein the cobalt-based alloy contains precipitates that include each of the p phase, the Laves phase and the carbide.

* * * * *